F. C. PRIESTLY & J. M. AUBERY.
DIFFERENTIAL AXLE DEVICE.
APPLICATION FILED JAN. 17, 1910.
962,049.
Patented June 21, 1910.
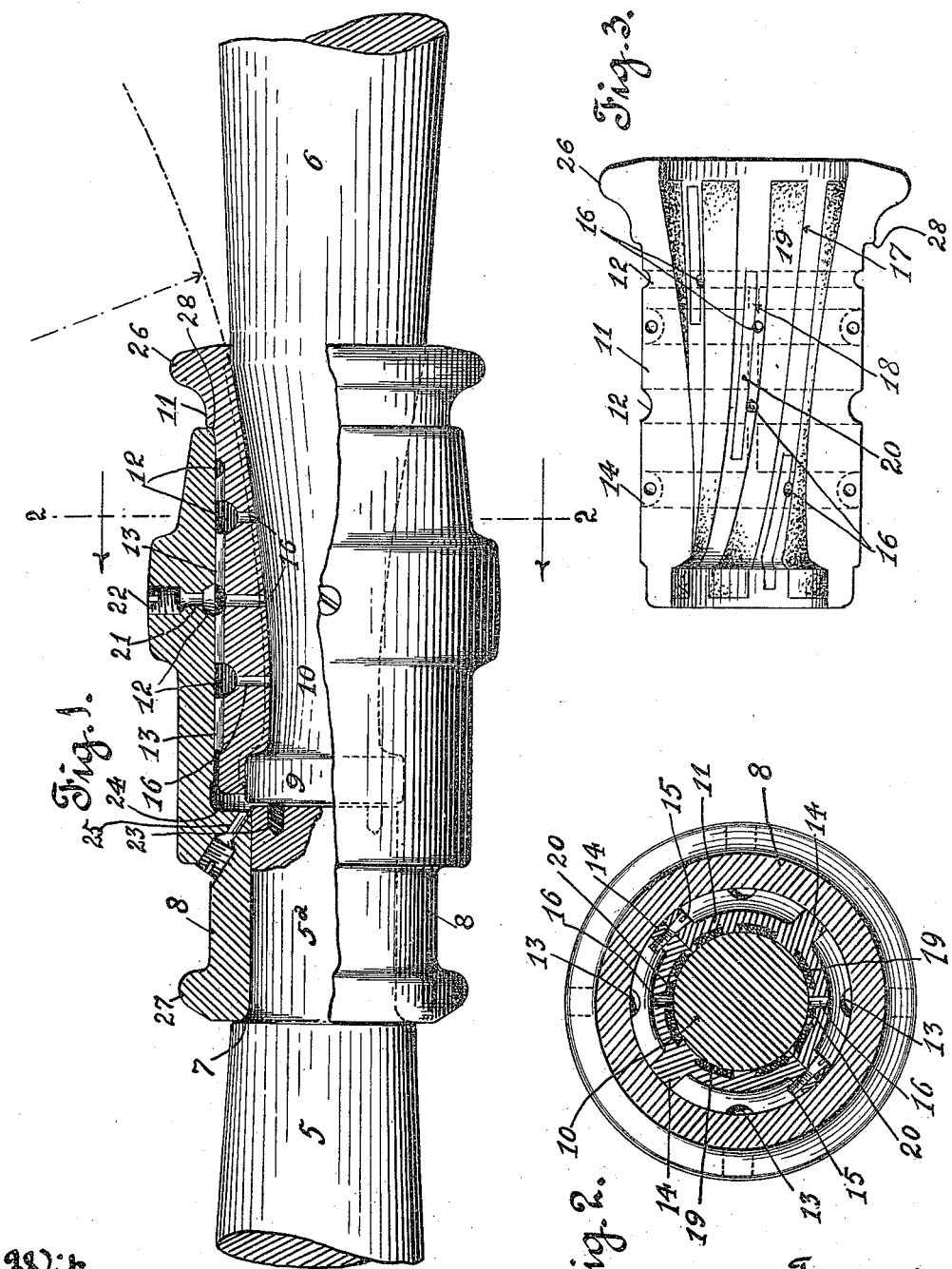
Witnesses,
F. E. Monteverde
D. B. Austin
Inventors,
Frank C. Priestly,
James M. Aubery,
By G. E. Darpham
Attorney.

UNITED STATES PATENT OFFICE.

FRANK C. PRIESTLY AND JAMES M. AUBERY, OF LOS ANGELES, CALIFORNIA.

DIFFERENTIAL AXLE DEVICE.

962,049.     Specification of Letters Patent.     Patented June 21, 1910.

Application filed January 17, 1910. Serial No. 538,360.

*To all whom it may concern:*

Be it known that we, FRANK C. PRIESTLY and JAMES M. AUBERY, both citizens of the United States, residing in the city of Los Angeles, county of Los Angeles, State of California, have invented new and useful Improvements in Differential Axle Devices, of which the following is a specification.

Our invention relates to a divided axle on the ends of which are rotating parts which at times are required to rotate at different rates of speed, and is primarily designed for use on railways, and the object thereof is to eliminate the torsional strain now incident to railway axles when turning a curve, and to obviate the wear on the wheels and the noise made thereby when turning a curve.

A further object is to provide a coupling joint of maximum efficiency with a minimum amount of material.

A further object is to provide a device of the character described herein provided with improved lubricating means.

We accomplish these objects by the device described herein, and illustrated in the accompanying drawings, in which:

Figure 1 is a side elevation partly in section of the coupling portion of our improved device. Fig. 2 is a section on the line 2—2 of Fig. 1. Fig. 3 is an inside view of one half of the inner sleeve of our coupler detached from the other members.

In the drawings the axle is formed of two sections 5 and 6, on the outer ends of which are the wheels, not shown. As the axle bars are never rolled perfectly, the adjacent meeting ends of the sections are preferably turned so as to be perfectly circular. One of the sections shown in the drawings as section 5 has the abutting end slightly reduced and formed into a perfect cylinder 5ª, thereby leaving a shoulder at 7. Upon this reduced portion is received the outer sleeve 8, which is forced thereon by hydraulic or other pressure. Section 6 has on its abutting end a head 9 and a curved neck 10 integral therewith. Where the axle is five inches in diameter the neck is preferably formed on a curve with a radius of 40 inches and is three and a half inches in diameter adjacent to the head. The curvature, however, may be varied.

In manufacture the head and neck may be rolled or drop forged to nearly perfect dimensions so as to require but little machine work. An inner sleeve 11 has an inner configuration to fit upon the head and neck of section 6 as shown in Fig. 1. This fit is a working fit. The inner sleeve is split longitudinally and has on the exterior thereof circumferential lubricating grooves 12 of which there may be any desired number. In the drawings we have shown four of these grooves which are connected by longitudinal grooves 13.

The circumferential grooves are crossed preferably at four points by stiffening lugs 14 which are preferably cast integral and form a part of the sleeve. Two oppositely disposed lugs are split by the cleavage of the halves of the sleeve, and when the parts are assembled for use are united by screws 15. These screws also hold the parts together when they are prepared for use. These circumferential grooves are also useful in this, that they lighten the inner sleeve and also permit a certain amount of oxidation to take place on the inner sleeve when the parts are assembled for use as shown in Fig. 1, thereby making a better bond between the outer and inner sleeve than if these grooves did not exist. The inner sleeve is provided with radial channels 16 which carry the lubricant to the interior of the sleeve where it contacts with the axle section. The interior of the inner sleeve is provided with diagonal grooves 17 and 18. Grooves 17 are filled with babbitt 19, and grooves 18 are filled with graphite 20. The outer sleeve is provided with a plurality of radial channels 21, the outer ends of which are closed by screw plugs 22. When these plugs are removed the lubricant can be fed into the grooves of the sleeve. The inner end of section 5 may be provided with graphite or other lubricant holding pockets 23. As shown in Fig. 1, when the parts are assembled the inner sleeve stops a little short of the head on section 6, thereby forming a circular lubricant channel 24 which may be fed through channel 25 in the outer sleeve. The outer ends of the sleeves are enlarged forming disassembling annular lugs 26 and 27, by means of which the sleeves can be separated by the use of appropriate tools, when desired. The outer surface of the inner sleeve is machined to near the disassembling lug so that it may be forced within the outer sleeve by hydraulic or other pressure and be retained therein when in use by its frictional engagement with the outer sleeve. In machining the inner sleeve that portion which enters the outer sleeve is slightly reduced in size, forming a shoulder 28 which prevents the inner sleeve from being pressed too far into the outer sleeve when the parts are assembled.

By this construction it will be seen that should any wear take place, either on the inner surface of the inner sleeve or the axle section that revolves therein, by machining off a part of the outer sleeve adjacent to shoulder 28, the inner sleeve can be pushed far enough within the outer sleeve to take up this wear, thereby making the coupling as good as new. This construction is a distinct advantage over those couplings in which the inner sleeve is of uniform diameter.

Having described our invention what we claim is;

1. A differential axle device mechanism, comprising an axle divided into two sections in alinement, one of said sections having a head and a curved neck; an outer sleeve having an enlarged bore at one end mounted upon the axle section without a head, said axle section entering the smaller bore thereof, and being held rigidly therein and an inner sleeve having an inner configuration to fit upon the head and curved neck of the axle section with a working fit; and adapted to be forced into the enlarged bore of the outer sleeve and held rigidly therein.

2. A differential axle device mechanism comprising an axle divided into two sections in alinement, one of said sections having a head and a curved neck; an outer sleeve having an enlarged bore at one end mounted upon the axle section without a head, provided with channels extending radially and having the outer ends thereof closed with plugs, said axle section entering the smaller bore of said sleeve and being held rigidly therein, and an inner sleeve having an inner configuration to fit upon the head and curved neck of the axle section with a working fit, said inner sleeve being adapted to be forced into the enlarged bore of the outer sleeve and held rigidly therein, and being provided on its outer surface with a plurality of circumferential grooves, said circumferential grooves being connected by longitudinal grooves, and also having radial channels extending from the circumferential to the interior of the sleeve, and provided with grooves in its inner surface adapted to receive graphite and Babbitt metal.

In witness that we claim the foregoing we have hereunto subscribed our names this 10th day of November, 1909.

F. C. PRIESTLY.
JAMES M. AUBERY.

Witnesses:
G. E. HARPHAM,
ARNOLD BECKER.